C. ROTH.
SNAP SWITCH.
APPLICATION FILED OCT. 28, 1913.

1,112,161.

Patented Sept. 29, 1914.
2 SHEETS—SHEET 1.

Witnesses

Inventor
Charles Roth
By his Attorney

C. ROTH.
SNAP SWITCH.
APPLICATION FILED OCT. 28, 1913.

1,112,161.

Patented Sept. 29, 1914.
2 SHEETS—SHEET 2.

Witnesses:
Gertrude N. Yates
May T. McGarry

Inventor
Charles Roth
By his Attorney

UNITED STATES PATENT OFFICE.

CHARLES ROTH, OF BROOKLYN, NEW YORK, ASSIGNOR TO THOMAS E. MURRAY, OF NEW YORK, N. Y.

SNAP-SWITCH.

1,112,161. Specification of Letters Patent. Patented Sept. 29, 1914.

Application filed October 28, 1913. Serial No. 797,724.

*To all whom it may concern:*

Be it known that I, CHARLES ROTH, a citizen of the United States, residing at Brooklyn, in the county of Kings and State of New York, have invented a certain new and useful Improvement in Snap-Switches, of which the following is a specification.

The invention is a spring-actuated snap switch, so constructed that the manual turning of a shaft first energizes the spring and then removes a movable dog which prevents said spring from throwing the lever. The dog after release follows the edge of a cam-plate over an arc of 180° and is again arrested by a straight edge of said plate, and upon being released a second time follows a similar and opposite semicircular edge back to another straight edge, and so regains its normal position. The switch lever mechanism thus controlled moves the lever alternately into and out of coöperative relation with fixed contacts.

Figure 1:
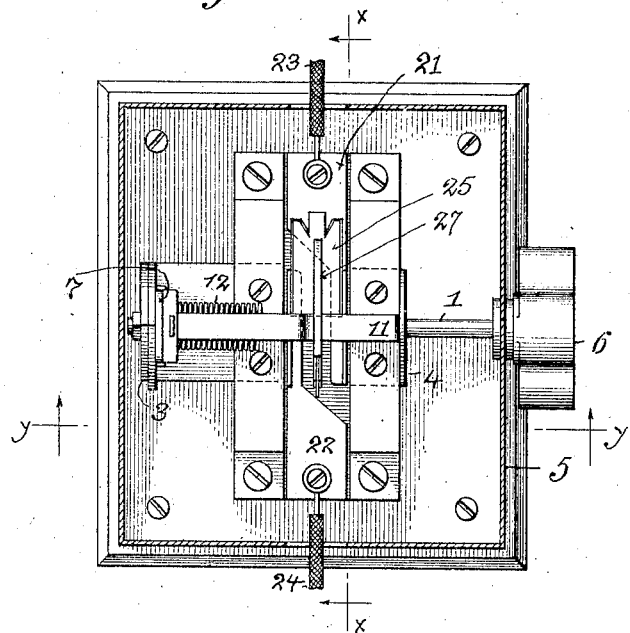
Figure 2:
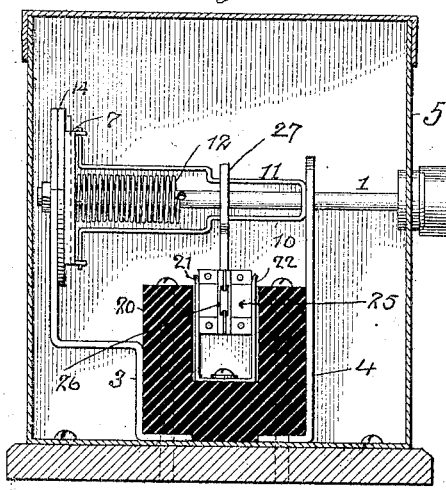
Figure 3:
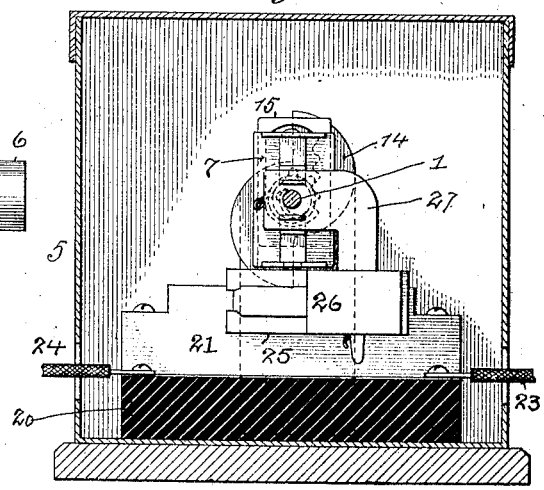
Figure 4:
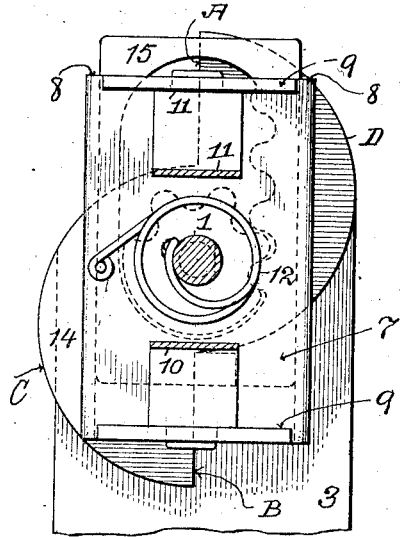
Figure 5:
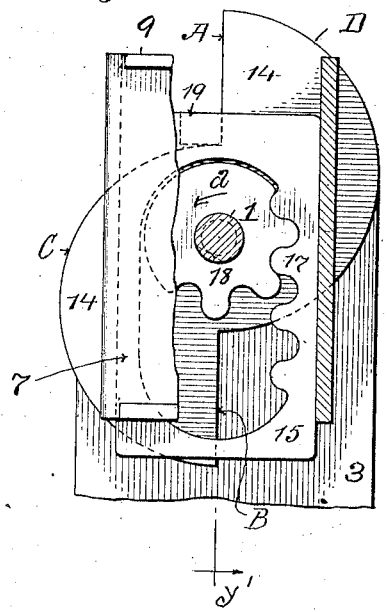
Figure 6:
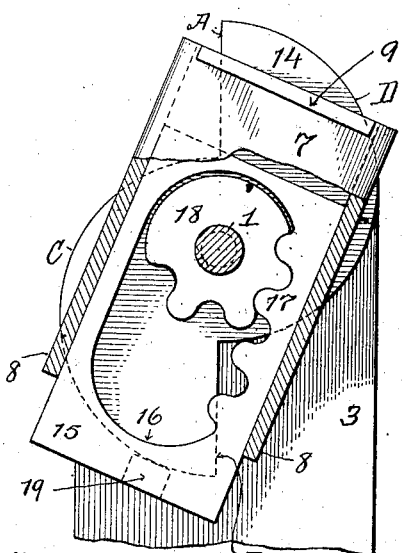
Figure 7:
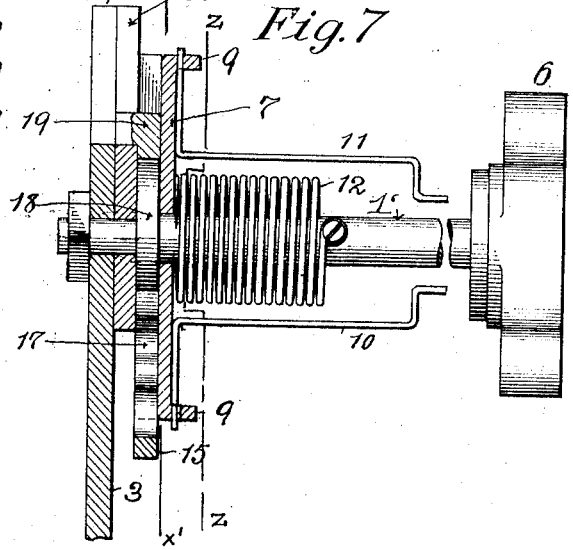

In the accompanying drawings—Figure 1 is a plan view of a fuse-carrying snap switch illustrating my invention. Fig. 2 is a section on line $y, y$ of Fig. 1. Fig. 3 is a section on line $x, x$ of Fig. 1. Figs. 4, 5, 6 and 7 are enlarged detail views of the switch mechanism. Fig. 4 is a section on line $z, z$ of Fig. 7. Fig. 5 is a section on line $x', x'$ of Fig. 7, with the guide-plate 7 broken away to show the pinion 18 and rack teeth on plate 15, and also exhibiting the dog 19 in engagement with the straight edge A of cam-plate 15. Fig. 6 is a view similar to Fig. 5, but showing the position of the parts when the dog 19 is following semicircular cam edge C. Fig. 7 is a section on line $y', y'$ of Fig. 5.

Similar numbers and letters of reference indicate like parts.

The shaft 1 is journaled in two standards 3 and 4, within the inclosing box 5, and extends through a wall of said box, outside of which it has an operating handle 6. Loose upon said shaft is a guide-plate 7 having longitudinal side flanges 8 on one face, and transverse end flanges 9 on the other face. The ends of two metal bars 10, 11 are secured in openings in flanges 9. Said bars extend parallel to shaft 1 on opposite sides thereof and are connected by a cross piece 13, Fig. 2, loose on shaft 1. A helical spring 12 surrounding shaft 1 is connected at one end to said shaft, and at the other end to guide-plate 7.

Fast upon standard 3 is a cam-plate 14 having two straight edges A, B, and two semicircular edges C, D. Between this cam-plate and the guide-plate 7 and having its edges sliding against the flanges 8 of said guide-plate is a dog-plate 15. Said plate has an elongated longitudinal slot 16, upon one longitudinal edge of which are formed rack teeth 17. A mutilated pinion 18 fast on shaft 1 is in slot 16, and the teeth of said pinion engage said rack teeth.

Upon one end of plate 15 is a dog 19. The expansive force of spring 12 tends to rotate guide-plate 7 upon shaft 1, and hence also dog-plate 15 which slides in the recess formed by flanges 8 on plate 7. When the dog is in contact with a straight edge A or B of fixed cam-plate 14, said edge acts as a stop to prevent such rotation, until the dog is moved outward along said edge to clear the same.

The parts being as shown in Fig. 5, with the dog lying in the angle between straight edge A and semicircular edge C of cam plate 14, the rotation of shaft 1 in the direction of arrow $a$ by means of handle 6 causes pinion 18 to move plate 15 so as to cause said dog to travel radially outward along straight edge A. At the same time, the rotation of shaft 1 winds up and so energizes spring 12. As soon as dog 19 clears straight edge A, the energized spring 12 is free to rotate plate 7. The dog then follows the semicircular edge D of cam-plate 14 until it meets edge B, which arrests its further movement.

To bring back the parts to the position of Fig. 5, the shaft 1 is again rotated in the same direction by handle 6. The dog then travels along edge B and clears the same, the spring 12 being again wound as before. The dog then follows semicircular edge C, as shown in Fig. 6, until arrested by edge A. The guide-plate 7 and bars 10, 11 secured thereto are, therefore, arrested twice during their rotation around shaft 1 at points 180° apart. It will be obvious, therefore, that if a switch lever be secured to bars 10, 11 to project at a right angle thereto, and a contact be disposed in the circular path of said lever, said lever may by rotating shaft 1 be moved into and out of coöperation with said contact, and will come to rest in each position. This will be clearly apparent from Figs. 1, 2 and 3, in which I have illustrated my switch applied to the insertion and removal of a fuse plug, coöperating with a pair of fixed contacts in the box 5. In said box and between the standards 3, 4 is a block 20 of insulating material having a channel in its upper side. In said channel and against the walls thereof are secured two contact plates 21, 22. To contact plate 21 is connected the circuit lead 23, and to contact plate 22 is connected the circuit lead 24. The fuse plug 25 carries the fuse strip 26 which is doubled over one edge of said plug and is broadened to cover the opposite sides thereof, so that when said plug is placed between the contact plates 21, 22, circuit is established through said strip. The body portion of the plug has an opening which receives a right-angled lever arm 27 which is fast upon the bars 10, 11. When said fuse plug is in contact-closing position between the plates 21, 22, it stands horizontally and below the shaft 1, as shown in Fig. 3. When shaft 1 is turned to rotate guide-plate 7 180°, as described, the plug 25 is lifted by arm 27 out of the contacts 21, 22, and by the quick action of spring 12 is carried into the reverse position 180° distant and above the shaft. The next movement of shaft 1 to rotate the guide-plate 180° in the same direction again brings the plug 25 to the position of Fig. 3.

I claim:

A snap switch, comprising a rotatable shaft, a guide-plate loose on said shaft and having side flanges, a helical spring on said shaft having its ends secured respectively to said shaft and said guide-plate, a fixed cam-plate facing said guide-plate, a dog-plate having a longitudinal slot receiving said shaft disposed between the side flanges of said guide-plate and between said guide-plate and said cam-plate and having rack teeth on an edge of said slot, a pinion on said shaft within said slot and engaging said rack teeth, a dog on said dog-plate coöperating with the edge of said cam-plate, a cross bar loose on said shaft, bars extending from said cross bar parallel to said shaft and secured at their ends to said guide-plate, a switch lever secured to said bars, and contacts coöperating with said lever.

In testimony whereof I have affixed my signature in presence of two witnesses.

CHARLES ROTH.

Witnesses:
GERTRUDE T. PORTER,
MAY T. MCGARRY.